United States Patent [19]
Coates et al.

[11] Patent Number: 6,007,745
[45] Date of Patent: Dec. 28, 1999

[54] LINEAR UV POLARIZER

[75] Inventors: David Coates, Merley Wimborne; Emma Jolliffe, Weymouth; Patrick Nolan, Poole, all of United Kingdom

[73] Assignee: Merck Patent Gesellschaft mit Beschrankter Haftung, Germany

[21] Appl. No.: 08/888,127

[22] Filed: Jul. 3, 1997

[30] Foreign Application Priority Data

Jul. 4, 1996 [GB] United Kingdom ............... 96110806

[51] Int. Cl.$^6$ .............................. F21V 9/14; C09K 19/00
[52] U.S. Cl. ........................ 252/585; 252/299.1; 428/1
[58] Field of Search ............................... 252/585, 299.1; 428/1

[56] References Cited

U.S. PATENT DOCUMENTS 4,810,433  3/1989  Takayanagi et al. ............... 252/299.1
5,024,850  6/1991  Broer et al. .
5,563,621  10/1996  Silsby .

FOREIGN PATENT DOCUMENTS 397263  11/1990  European Pat. Off. .

*Primary Examiner*—Philip Tucker
*Attorney, Agent, or Firm*—Millen, White, Zelano & Branigan, P.C.

[57] ABSTRACT

The invention relates to a linear UV polarizer based on a polymerized mesogen obtained by curing with actinic radiation or heat of a polymerizable composition comprising:

a) a liquid crystalline component A composed of one or more achiral mesogenic compounds having at least one polymerizable end group optionally linked via a spacer group to a mesogenic core, b) a dichroic component B that absorbs light in the UV region, with an absorption maximum of from 320 to 440 nm, and c) a photoinitiator or thermal initiator component C.

28 Claims, No Drawings

LINEAR UV POLARIZER

The invention relates to a liquid crystal linear UV polarizer and to the use of such a linear UV polarizer as a spatial UV modulator.

There is a high demand for linear UV polarizers, since they allow the production of spatial UV modulators, e.g., for printer heads, in photocopy machines, for creating UV patterns, for UV curing of polymers, and in particular, in microelectronics.

Furthermore, they can be used for tuning the intensity of UV radiation for optical UV measurement equipment, in particular for optical work benches, optical computing or for CCD coupled devices. Other fields of application are in information displays, in particular color displays, in the advertising industry, in public information displays including static or animated displays, based on the UV pattern monitored on a luminescent screen.

Conventional liquid crystal polarizers are used to polarize visible light. The European Patent application EP 0 397 263 discloses a liquid crystal polar-iser based on a mesogenic polymer material comprising a dichroic dye which absorbs light in the visible region.

The International patent application WO 93110639 suggests a display apparatus in which the visible light emitted by UV stimulated phosphor elements is switched on or off with the aid of a liquid crystal TN device using crossed polarisers. However, it is more efficient to select each pixel directly by UV radiation that is turned on or off by a TN device having crossed UV polarizers.

SUMMARY OF THE INVENTION

The present invention provides a linear UV sheet polarizer based on polymerized mesogens, a preferred aspect being that said polymenized mesogens are obtainable by curing of a polymerizable composition using actinic radiation or heat. The polymerizable compositions comprises:

a) a liquid crystalline component A comprising of one or more achiral mesogenic compounds having at least one polymerisable end group optionally linked via a spacer group to the mesogenic core, b) a dichroic component B that absorbs light in the UV region, prefer ably with an absorption maximum of from 320 to 440 nm, and c) a photoinitiator component or a thermal initiator component C.

In a preferrred embodiment the polymerization of the polymerizable composition is initiated by actinic radiation, rather than by heat. Especially preferred is irradiation by UV.

Actinic radiation here encompasses UV radiation as well as light in the range of the visible spectrum. Compounds absorbing in this range of wavelengths and decomposing into reactive species initiating polymerization of the precursor are simply called photoinitiators throughout the text.

In a preferred embodiment the invention relates to:

a) a linear UV polarizerswherein said liquid crystalline component A comprises at least one compound of formula I

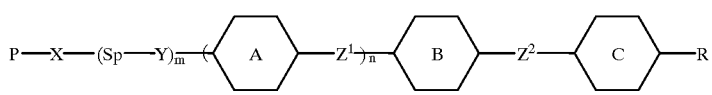

in which

P is a polymerizable group,

X and Y are each independently —O—, —S—, —COO—, —OCO—, —OCOO—, —SCO—, —COS— or a single bond, Sp is a linear spacer group with 1 to 16 carbon atoms, the rings A, B and C denote each independently 1,4-phenylene being optionally substituted by one or two halogen atoms, cyano groups, $C_{1-6}$-alkyl groups, $C_{1-6}$-alkoxy groups or $C_{1-6}$-alkanoyl groups wherein one or more H atoms therein may be substituted by F or Cl or the rings denote 1,4-cyclohexylene, $Z^1$ and $Z^2$ are each independently —CH$_2$—, —CH$_2$—, —COO—, —OCO—, —OCH$_2$—, —CH$_2$O—, —CH=CH—, —CH=CH—COO—, —OCO—CH=CH—, —C≡C— or a single bond, R is an optionally fluorinated achiral alkyl, alkoxy or alkenyl group with 1 to 12 C atoms or denotes halogen or cyano or has one of the meanings given for P—X—(Sp—)$_m$—, m is 0 or 1, and n is 0, 1 or 2, b) a linear UV polarizer, wherein said dichroto component B comprises at least one rod-shaped compound having an absorption maximum between 320 and 440 nm, preferably having a structural element of one of the following formulae II1 to II3:

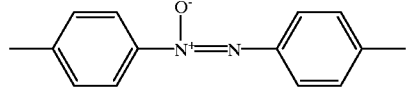

II1

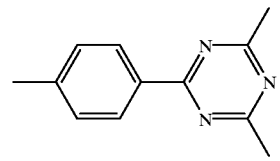

II2

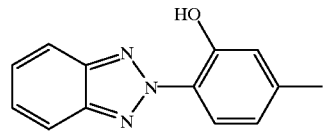

II3 c) a linear UV polarizer, the film thickness of which is about 2 to 15 μm, in particular 3 to 10 μm.

In a particularly preferred embodiment, the component A is a composition of at least two compounds of formula I having at least two terminal polymerizable groups of formula P—X—Sp—Y—, in which the spacer groups have different chain length.

The achiral compounds of formula la are particularly preferred:

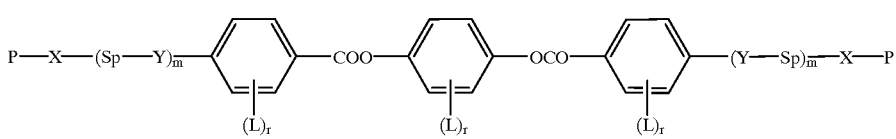

in which P, X, Sp, Y and m have the meaning given for formula I and

L are each independently halogen, CN of alkyl, alkoxy or alkanoyl each having up to 6 carbon atoms, which is unsubstituted or mono- or polysubstituted by F or Cl, and r is 0, 1 or 2.

Sp is preferably a group of formula $-(CH_2)_s-$, in which s is an integer of 1 to 12, in particular preferred are compositions of at least two compounds of formula I a having different spacer chain lengths.

P is preferably selected from $CH_2=CW-$, $CH_3-CH=CW-$ and the structural elements I1 and I2

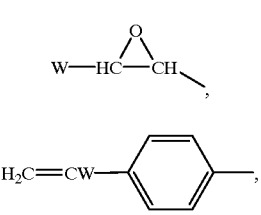

in which W denotes H, Cl or $CH_3$.

Particularly preferred polymerisable groups P—X are selected from acrylate, methacrylate, vinyl, vinyloxy, propenyl, propenyloxy, epoxy and styryl, very particular preferably from acrylate, methacrylate, propenyloxy and epoxy.

L is preferably F, Cl, CN, $NO_2$, $CH_3$, $C_2H_5$, $OCH_3$, $OC_2H_5$, $COCH_3$, $COC_2H_5$, $CF_3$ and $OCF_3$, in particular F, $CH_3$, $OCH_3$, and $COCH_3$.

The films of the instant invention can be prepared according to the following method, for example:

A suitable mixture of nematic reactive mesogens and chiral dopants is formulated such that the desired reflection wavelength is obtained when the mixture is melted into the cholesteric phase. A small amount (e.g., 1–5%) of suitable photoinitiator is added. This mixture is then dissolved in a suitable solvent, such as toluene or methyl ethyl ketone. Typically, a 10–30% solution of solids is used. This solution is filtered through a 0.2 micron pore size filter. Undirectionally rubbed polyimide coated onto glass or plastic sheet is coated with the above solution. The solution can be spin coated, Meyer bar coated, Baker bar coated ro any other standard coating technique can be used (e.g., gravure or reverse roll or micro gravure). The thickness of the web coating respectively the conditions of the other coating methods are such that after evaporation of the solvent, preferably a 3–5 micron cholesteric film remains. After evaporation of the solvent at, for example, 60–100° C., a second similarly aligned substrate is placed on the top of the coating and by a combination of shearing and heating, the film is aligned into a planar or Grandjean texture. The aligned cholesteric liquid crystal is then irradiated with UV light of appropriate wavelength for the photoinitiator used and a polymer film produced. The film can be de-laminated from the substrate and bonded to the quarter wave foil (QWF), or used as made providing the substrates are UV transparent.

The polymerization of the precursor can be initiated by the use of a thermal initiator as initiating component C. Such thermal starters are widely known.

For the photoinitiator component C in general any photoinitiator can be used that decomposes when exposed to actinic radiation. These photoinitiators are commercially available in a wide variety.

For the instant invention it is rather important that in case a photoinifiator is used as initiating component C it is properly selected. It preferably should absorb light in the visible spectral range to limit any possible interference with the function of the chiral systems as UV polarizers. Such undesired effects might e.g. result from the cholesteric film reflecting just that part of UV radiation which would be required for the photoinitiating step if the photoinitiator is not properly selected. On the other hand residual photoinitiator might lead to undesired absorption of the UV radiation in the final operation of the system.

Preferably the photoinitiator component C comprises at least one compound selected from the following group of formulae IIIa to IIIe

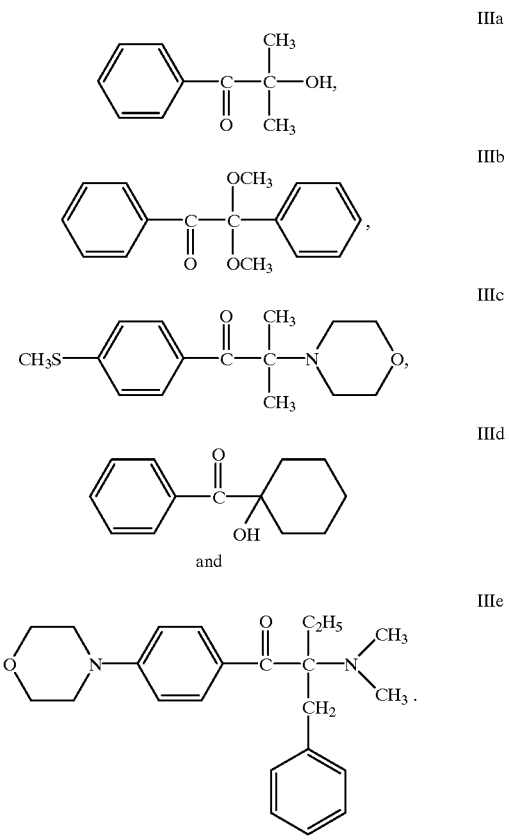

In addition to photoinitiators the polymerizable composition can also comprise one or more other suitable components such as, for example, catalysts, stabilizers, co-reacting monomers, surface-active compounds or sensitizers such as, for example ITX (Isopropyl thioxanthone) to aid curing.

It is alternatively possible to add, for example, a quantity of up to 20% by weight of a nonpolymerizable liquid-crystalline material to adapt the optical properties of the polymer.

It is also possible to add up to 20% of a non mesogenic compound with two or more polymerizable functional groups to increase crosslinking of the polymers. Typical examples for difunctional non mesogenic monomers are alkyldiacrylates or alkyldimethacrylates with alkyl groups of 1 to 20 C. atoms. Typical examples for non mesogenic monomers with more than two polymerizable groups are trimethylpropanetrimethacrylate or pentaerythritoltetraacrylate.

The dichroic component B comprises preferably at least one component of the formula IIa

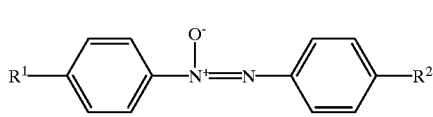

IIa in which $R^1$ and $R^2$ have the meaning given for R in formula I, in particular in which at least one of $R^1$ and $R^2$ denotes a polymerizable group of formula P—X—(Sp—Y)$_m$—.

In a preferred embodiment, the linear UV polarizer is based on polymerized mesogens obtained by UV curing of a polymerizable composition comprising a) 60 to 99%, preferably 75 to 99%, in particular 85 to 99% by weight of the liquid crystalline component A b) 0.1 to 30%, preferably 0.5 to 15%, in particular 1 to 10% by weight of the dichroic component B, and c) 0.01 to 10, preferably 0.1 to 5% by weight of the photoinitiator component or thermal initiator component C.

The use of monoreactive and direactive polymerizable compounds of group A (i.e. compounds having one or two polymerizable groups P respectively) determines the optical properties of the linear polarizer, in particular their temperature dependence and the mechanical stability of the polarizer film. It is therefore sometimes useful to vary the crosslinking by using different ratios of mono- and direactive compounds of formula I.

In a preferred embodiment the polymerizable composition comprises mono- and direactive compounds of formula I. In another preferred embodiment the polymerizable composition comprises only direactive compounds of formula I. In another preferred embodiment the polymerizable composition comprises only monoreactive compounds of formula I.

In a preferred embodiment the linear UV polarizer according to the present invention having a contrast ratio of about 10:1 to 20:1 is combined with an additional circular UV polarizer.

The additional circular UV polarizer is preferably laminated to a quarter wave foil having a retardation value of 0.25 times of the wavelength of light transmitted by the circular polarizer to provide linear polarized light. The contrast ratio of this laminated film is about 40:1.

The additional circular UV polarizer preferably is obtainable by curing of a polymerizable composition which comprises 15 to 95% by weight of a liquid crystalline component composed of one or more achiral mesogenic compounds having at least one polymerizable end group optionally linked via a spacer to the mesogenic core, 5 to 85% by weight of a liquid crystalline component composed of one or more chiral mesogenic compounds having at least one polymerizable end group optionally linked via a spacer group to the mesogenic core, and 0.01 to 10% by weight of a polymerization initiator. The curing can be initiated by actinic radiation or by heat.

The additional circular UV polarizer with quarter wave foil exhibits a polarization contrast ratio of about 40:1 by this combination. The contrast ratio can be determined by rotating a second identical set of circular UV polarizer and quarter wave foil, placed opposite the set being measured, by angles of multiples of 90°. The combination of the linear and circular polarizers with quarter wave foil yields a contrast ratio of 400:1, i.e., the product of the individual polarizers in the stack, 40:1×10:1 =400:1. This technique has the advantage that the linear polarizer does not have to absorb as much UV light, thus preventing overheating and increasing its life time.

In another preferred embodiment, the inventive linear UV polarizer, the additional circular UV polarizer and the quarter wave foil are combined with a UV lamp and a reflector that re-reflects the circularly polarized light, which was reflected from the inventive circular UV polarizer, with a change of its handedness. The re-reflected light will then be transmitted by the circular UV polarizer, the quarter wave plate and the linear UV polarizer. In this way, most of the UV light is converted to linearly polarized UV light. This is especially advantageous compared to state-of-the-art linear polarizers, the transmission of which in the best case is only 50% or less of the incident light.

In another preferred embodiment, the UV lamp is combined with a diffuser that depolarizes the light coming from the reflector. This light is then again directed onto the circular UV polarizer and split up into a reflected and a transmitted portion. In this way, too, most of the UV light is converted to linearly polarized UV light.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding European application No. 96110806.5, filed Jul. 4, 1996, is hereby incorporated by reference.

EXAMPLES

An embodiment of the present invention will now be described, by way of example only.

Without further elaboration, it is believed that one skilled in the art can, using the preceding description, utilize the present invention to its fullest extent. The preferred specific embodiments are, therefore, to be construed as merely illustrative, and not limitative of the disclosure in any way whatsoever.

The following abbreviations are used:

$\lambda$=wavelength of actinic irradiation l=lamp power

The following acronyms are used to define the different components of the liquid crystalline composition according to the invention:

Compound A-1

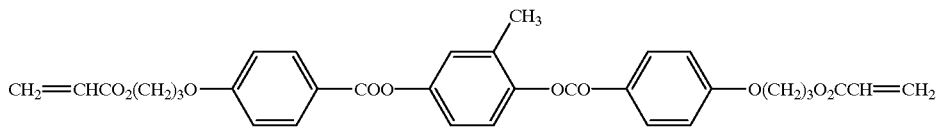

Mixture M1 of compounds A-1 to A-4

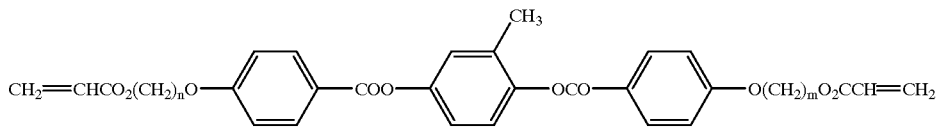

A-1 n=m=3 (25%); A-2 n=m=6 (25%);
A-3 n=3, m=6 (25%); A-4 n=6, m=3 (25%) AZX-n0m:

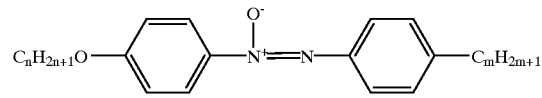

Irgacure 184 is a commercially available photoinitiator from Ciba Geigy AG.

Example 1

A polymerizable composition consisting of:

| Acronym | wt. % |
|---|---|
| M-1 | 97.00 |
| AZX-102 | 0.66 |
| AZX-104 | 1.34 |
| Irgacure 184 | 1.00 | is filled in a cell having a cell gap of 5 $\mu$m and exposed to UV light ($\lambda$=370–390 nm, l=6 mW/cm$^2$) for five minutes at 75° C.

The transmission at 365 nm through crossed and parallel polarizer films obtained as described above are measured in a Perkin Elmer 9 spectrophotometer:

| Crossed Films | Parallel Films | Contrast |
|---|---|---|
| 1.3% | 11.7% | 9.02 |

Example 2

A polymerizable composition consisting of:

| Acronym | wt. % |
|---|---|
| M-1 | 95.00 |
| AZX-102 | 1.34 |
| AZX-104 | 2.66 |
| Irgacure 184 | 1.00 | is filled in a cell having a cell gap of 5 $\mu$m and exposed to UV light ($\lambda$=370–390 nm, l=7 mW/cm$^2$) for five minutes at 25° C.

The transmission at 365 nm through crossed and parallel polarizer films obtained as described above are measured in a Perkin Elmer 9 spectrophotometer:

| Crossed Films | Parallel Films | Contrast |
|---|---|---|
| 9.3% | 22.6% | 2.43 |

Example 3

A polymerizable composition of example 2 is filled in a cell having a cell gap of 10 $\mu$m and exposed to UV light ($\lambda$=370–390 nm, l=7 mW/cm$^2$) for five minutes at 25° C.

The transmission at 365 nm through crossed and parallel polarizar films obtained as described above are measured in a Perkin Elmer 9 spectrophotometer:

| Crossed Films | Parallel Films | Contrast |
|---|---|---|
| 2.6% | 11.6% | 4.47 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid crystal linear UV shaped polarized based on a polymer obtained by curing with actinic radiation or heat of a polymerizable composition comprising:
    a) a liquid crystalline component A composed of two or more different achiral mesogenic compounds each having two polymerizable end groups linked via spacer groups to a mesogenic core, wherein for at least one of the compounds the spacer groups have different chain lengths,
    b) a dichroic component B that absorbs light in the UV region, with an absorption maximum of from 320 to 440 nm, and
    c) a photoinitiator or thermal initiator component C.

2. A linear UV polarizer according to claim 1, wherein the liquid crystalline component A comprises at least one compound of formula I:

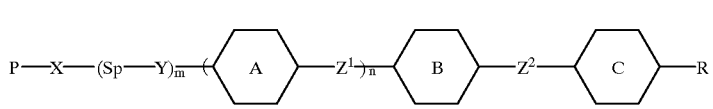

in which
P is a polymerizable group,
X and Y are each independently —O—, —S—, —COO—, —OCO—, —OCOO—, —SCO—, —COS— or a single bond,
Sp is a linear spacer group with 1 to 16 carbon atoms,
A, B and C each independently denote 1,4-phenylene optionally substituted by one or two halogen atoms, cyano groups, $C_{1-6}$-alkyl groups, $C_{1-6}$-alkoxy groups or $C_{1-6}$-alkanoyl groups wherein one or more H atoms are optionally substituted by F or Cl, or denote 1,4-cyclohexylene,
$Z^1$ and $Z^2$ are each independently —CH$_2$CH$_2$—, —COO—, —OCO—, —OCH$_2$—, —CH$_2$O—CH=CH—, —CH=CH—COO—, —OCO—CH=CH—, —C≡C— or a single bond,
R has one of the meanings given for P—X—(Sp—Y)$_m$—,
m is 0 or 1, and
n is 0, 1 or 2.

3. A linear UV polarizer according to claim 2, wherein the liquid crsytalline component A comprises a composition of at least two different compounds of formula I each having two terminal polymerizable groups of formula P—X—Sp—Y—, and wherein for at least two of the different compounds the spacer groups in each have different chain lengths.

4. A linear UV polarizer according to claim 2, wherein the liquid crystalline component A comprises at least one compound of formula Ia

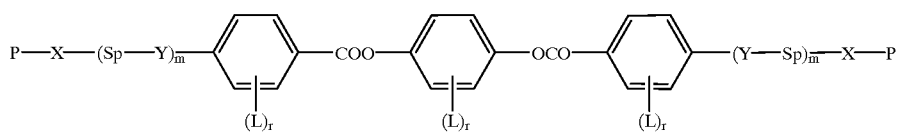

in which

P, X, Sp, Y and m have the meaning given for formula I and

L are each independently halogen, CN, or alkyl, alkoxy or alkanoyl each having up to 6 carbon atoms which is unsubstituted or mono- or polysubstituted by F or Cl, and r is 0, 1 or 2.

5. A linear UV polarizer according to claim 1, where in said component B comprises a compound having a structural element of the following formulae II1 to II3:

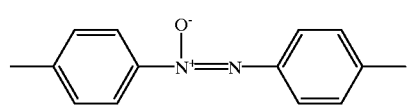

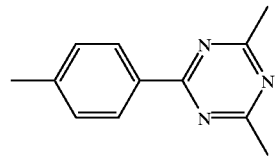

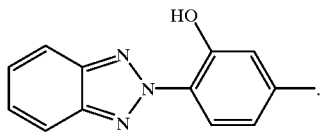

6. A linear UV polarizer according to claim 1, wherein the polymerizable composition comprises:
 a) 60 to 99% by weight of the liquid crystalline component A,
 b) 0.1 to 30% by weight of the dichroic component B, and
 c) 0.01 to 10% by weight of the photoinitiator or thermal initiator component C.

7. A linear UV polarizer according to claim 1, wherein the film thickness of said polarizer is about 2 to 15 μm.

8. A linear UV polarizer according to claim 1, wherein the film thickness of said polarizer is from 3 to 10 μm.

9. A linear UV polarizer according to claim 6, wherein the total % by weight of the photoinitiator or thermal initiator, component C, is from 0.1 to 5%.

10. A linear UV polarizer according to claim 1, wherein the polymerizable composition is cured by UV curing.

11. A linear UV polarizer according to claim 2, wherein in formula I, Sp is —(CH$_2$)$_s$— where s is an integer of 1 to 12.

12. A linear UV polarizer according to claim 2, wherein in formula I, P is CH$_2$=CW—, CH$_3$—CH=CW— or a group of one of the formulae I1 or I2

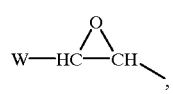

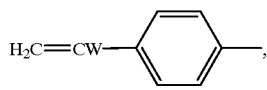

in which W is H, Cl or CH$_3$.

13. A linear UV polarizer according to claim 2, wherein in formula I, P—X— is an acrylate, methacrylate, vinyl, vinyloxy, propenyl, propenyloxy, epoxy or styryl group.

14. A spatial linear UV modulator which comprises a linear UV polarizer according to claim 1.

15. A liquid crystal linear UV sheet polarizer based on a polymer obtained by curing with actinic radiation or heat of a polymerizable composition comprising a) a liquid crystalline component A composed of at least one achiral mesogenic compound having only one polymerizable end group optionally linked via a spacer group to a mesogenic core and at least one achiral mesogenic compound having two polymerizable end groups optionally linked via a spacer group to a mesogenic core,
b) a dichroic component B that absorbs light in the UV region, with an absorption maximum of from 320 and 440 nm, and
c) a photoinitiator or thermal initiator component C.

16. A linear UV polarizer according to claim 15, wherein the liquid crystalline component A comprises at least one compound of formula I:

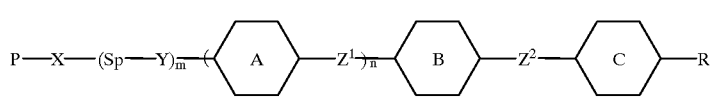

in which

P is a polymerizable group,

X and Y are each independently —O—, —S—, —COO—, —OCO—, —OCOO—, —SCO—, —COS— or a single bond, Sp is a linear spacer group with 1 to 16 carbon atoms, A, B and C each independently denote 1,4-phenylene optionally substituted by one or two halogen atoms, cyano groups, $C_{1-6}$-alkyl groups, $C_{1-6}$-alkoxy groups or $C_{1-6}$-alkanoyl groups wherein one or more H atoms are optionally substituted by F or Cl, or denote 1,4-cyclohexylene, $Z^1$ and $Z^2$ are each independently —CH$_2$CH$_2$—, —COO—, —OCO—, —OCH$_2$—, —CH$_2$O—, —CH=CH—, —CH=CH—COO—, —OCO—CH=CH—, —C≡C— or a single bond, R is an optionally fluorinated achiral alkyl, alkoxy or alkenyl group with 1 to 12 C atoms, is halogen or cyano or has one of the meanings given for P—X—(Sp—Y)$_m$—, m is 0 or 1, and n is 0, 1 or 2.

17. A linear UV polarizer according to claim 16, wherein the liquid crystalline component A comprises a composition of at least two compounds of formula I having at least two terminal polymerizable groups of formula P—X—Sp—Y—, wherein the spacer groups have different chain length.

18. A linear UV polarizer according to claim 16, wherein the liquid crystalline component A comprises at least one compound of formula Ia

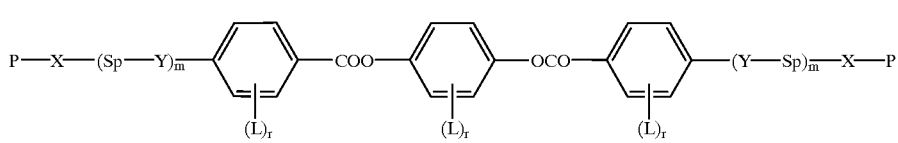

in which

P, X, Sp, Y and m have the meaning given for formula I and

L are each independently halogen, CN, or alkyl, alkoxy or alkanoyl each having up to 6 carbon atoms which is unsubstituted or mono- or polysubstituted by F or Cl, and r is 0, 1 or 2.

19. A linear UV polarizer according to claim 15, wherein said component B comprises a compound having a structural element of the following formulae II1 to II3:

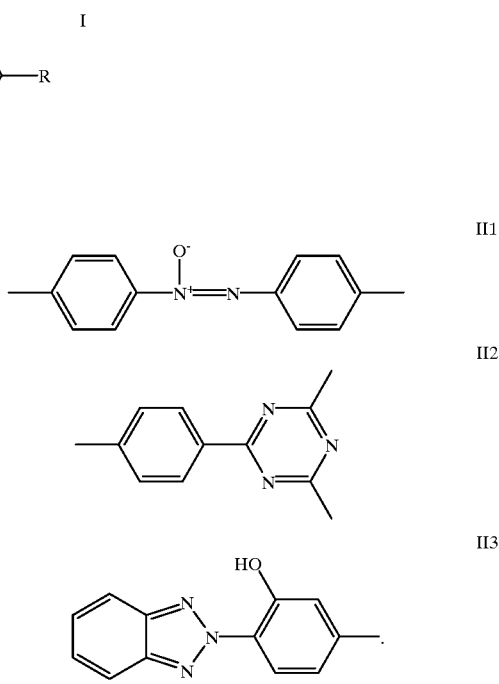

20. A linear UV polarizer according to claim 15, wherein the polymerizable composition comprises:

a) 60 to 99% by weight of the liquid crystalline component A,
b) 0.1 to 30% by weight of the dichroic component B, and
c) 0.01 to 10% by weight of the photoinitiator or thermal initiator component C.

21. A linear UV polarizer according to claim 15, wherein the film thickness of said polarizer is about 2 to 15 μm.

22. A linear UV polarizer according to claim 15, wherein the film thickness of said polarizer is from 3 to 10 μm.

23. A linear UV polarizer according to claim 20, wherein the total % by weight of the photoinitiator or thermal initiator, component C, is from 0.1 to 5%.

24. A linear UV polarizer according to claim 15, wherein the polymerizable composition is cured by UV curing.

25. A linear UV polarizer according to claim 16, wherein in formula I, Sp is $—(CH_2)_s—$ where s is an integer of 1 to 12.

26. A liner UV polarizer according to claim 16, wherein in formula I, P is $CH_2{=}CW—$, $CH_3—CH{=}CW—$ or a group of one of the formulae I1 or I2

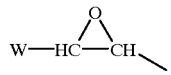
I1

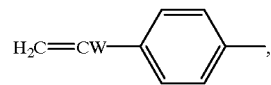
I2 in which W is H, Cl or $CH_3$.

27. A linear UV polarizer according to claim 16, wherein in formula I, P—X— is an acrylate, methacrylate, vinyl, vinyloxy, propenyl, propenyloxy, epoxy or styryl group.

28. A spatial linear UV modulator which comprises a linear UV polarizer according to claim 15.

* * * * *